United States Patent
Ling et al.

(10) Patent No.: US 6,799,148 B2
(45) Date of Patent: Sep. 28, 2004

(54) ELECTRONIC MAIL BASED REMOTE HISTORIAN AND SYSTEM

(75) Inventors: Bo Ling, Sharon, MA (US); Radha Jaldu, Mansfield, MA (US)

(73) Assignee: Invensys Systems, Inc., Foxboro, MA (US)

(*) Notice: Subject to any disclaimer, the term of this patent is extended or adjusted under 35 U.S.C. 154(b) by 0 days.

(21) Appl. No.: 09/848,847

(22) Filed: May 3, 2001

(65) Prior Publication Data

US 2002/0165699 A1 Nov. 7, 2002

(51) Int. Cl.⁷ .............................................. G06F 17/40
(52) U.S. Cl. ................................. 702/188; 379/100.08
(58) Field of Search .................... 379/93.24, 100.08; 702/188, 122, 62; 709/206; 700/19, 73

(56) References Cited

U.S. PATENT DOCUMENTS

| | | |
|---|---|---|
| 4,517,637 A | 5/1985 | Cassell |
| 4,910,692 A | 3/1990 | Outram et al. |
| 5,650,930 A | 7/1997 | Hagenbuch |
| 5,680,329 A | 10/1997 | Lloyd et al. |
| 5,890,163 A | 3/1999 | Todd |
| 5,917,428 A * | 6/1999 | Discenzo et al. ...... 340/870.01 |
| 5,964,839 A | 10/1999 | Johnson |
| 5,970,430 A | 10/1999 | Burns et al. |
| 5,995,916 A | 11/1999 | Nixon et al. |
| 6,084,600 A | 7/2000 | Munshi |
| 6,088,659 A | 7/2000 | Kelley et al. |
| 6,167,358 A * | 12/2000 | Othmer et al. ............. 702/188 |
| 6,298,308 B1 * | 10/2001 | Reid et al. .................. 702/56 |
| 6,332,110 B1 * | 12/2001 | Wolfe .......................... 702/22 |
| 6,349,291 B1 * | 2/2002 | Varma ......................... 705/35 |
| 6,434,502 B1 * | 8/2002 | Harrison ..................... 702/122 |

OTHER PUBLICATIONS

Revolutionary Worker #1070, "Who's Reading Your E-mail", Sep. 17, 2000, FBI.*

* cited by examiner

*Primary Examiner*—Marc S. Hoff
*Assistant Examiner*—Paul L Kim
(74) *Attorney, Agent, or Firm*—David Barron, Esq.; Richard L. Sampson, Esq.

(57) ABSTRACT

A method and system is provided for updating a historian with data captured by a process variable transmitter, in which the process variable transmitter incorporates the data into an electronic mail message and a historian host receives the electronic mail message, extracts the data and incorporates it into the historian. The system includes a process variable transmitter configured as an electronic mail client, and includes a remote historian.

30 Claims, 5 Drawing Sheets

ELECTRONIC MAIL BASED REMOTE HISTORIAN AND SYSTEM

BACKGROUND OF THE INVENTION

(1) Field of the Invention

The present invention generally relates to electronic data collection. This invention more particularly relates to computer and/or electronic methods and systems for collecting and storing historical data.

(2) Background Information

Industrial processes such as chemical, petroleum, electric power generating, automotive, mining, semiconductor, and other manufacturing and refining processes typically include numerous field devices disposed at various locations to measure and/or control parameters of the process. These field devices may be for example, process variable transmitters, including sensors, such as temperature, pressure, flow rate, velocity, voltage, and current sensors, timers, counters, control elements, such as valves and switches and/or other data logging devices. In addition, office and residential dwellings often include automated data logging systems associated with metering, alarms, appliances, communications and other devices. The data generated or captured by these devices may be downloaded by a data link to a remote fixed location where a historical database is stored. Depending on the purposes for the data collection and archival, various statistical and/or other analysis may be performed. For example, process control data may be analyzed by a statistical process control program to determine whether a process is within predetermined control parameters.

There are numerous examples of data collection, archival and analysis systems and methods in the art. For example, U.S. Pat. No. 5,656,930 to Hagenbuch discloses an apparatus and method for monitoring loads of material carried by haulage vehicles. Load data is captured by sensors mounted directly to the vehicle and may be downloaded to a remote location, by an infrared data link, where the data may be stored and analyzed. The load data may also be downloaded to other locations, such as a dispatcher or a loader, by a radio frequency link.

U.S. Pat. No. 5,680,329 to Loyld et al., discloses a code compliance verification system and method for a water-based fire protection system capable of sensing and recording data relevant to compliance, independently verifying code compliance and generating and distributing reports based on the data. The data is typically transmitted from an onsite portion to an offsite (i.e. remote) portion (typically a PC) via modem, cellular, or RF link. The data is typically analyzed by statistical software and archived in a commercially available database. The offsite portion also may include a feature that automatically generates and forwards a report to a predetermined distribution list by various means (such as by electronic mail).

U.S. Pat. No. 6,088,659 to Kelley et al., discloses an automated meter reading server having an open, distributed architecture that collects, loads, and manages system-wide data collected from numerous energy meters and routes the data automatically to upstream business systems, such as to generate customer billing. The automated meter reader server obtains data from meters equipped with modems via standard telephone lines or public RF networks. The server includes a scalable database that allows for storage, analysis and retrieval of metering data from numerous metering points.

U.S. Pat. No. 6,163,761 to Kent discloses an electronic production system and method that includes a memory, an input/output interface for receiving production data directly from a plurality of sensors, and a processor. The input/output interface may be either a manual entry device such as a keyboard or mouse or direct links (e.g. an electrical connection) to the plurality of sensors. The processor is typically a server or PC configured to run various software packages for retrieving, storing and analyzing data from the plurality of sensors.

While the systems and methods of the prior art may work well for some applications, they tend to be limited in others. For example, the above described systems and methods typically require the remote computer to be continuously linked (i.e. online) with the various data-sensing or data-capture devices in order to ensure accurate and/or complete data transmission. However, in some applications it may be desirable to have a system in which the remote computer may be taken offline without fatally interrupting data transmission. In those same or other applications it may further be desirable for the remote computer to be portable such that it may be transported between two or more locations without fatally interrupting data transmission during transport. For yet additional applications it may be desirable to have an Internet (e.g. World Wide Web) enabled historian.

In view of the drawbacks of the prior art and the need for enhanced flexibility with respect to the location and the means of linking the remote computer, there exists a need for an improved data storage method and system.

SUMMARY OF THE INVENTION

In one aspect, the present invention includes a method for updating a historian with data captured by a process variable transmitter. The method includes capturing the data with the process variable transmitter, the transmitter being configured as an electronic mail client. The method also includes formatting the data into a format usable by the historian, incorporating the data into an electronic mail message, and sending the electronic mail message to a remote historian host. The electronic mail message is received at the remote historian host, the data from the electronic mail message is extracted and then incorporated into the historian.

In another aspect, this invention includes a method for updating a historian with data captured by a process variable transmitter. The method includes receiving an electronic mail message at a remote historian host, the electronic mail message including the data captured by the process variable transmitter. The method further includes extracting the data from the electronic mail message and incorporating the data into the historian.

In yet another aspect, this invention includes a method for transferring data captured by a process variable transmitter to a historian. The method includes configuring the transmitter as an electronic mail client and capturing the data with the transmitter. The method further includes incorporating the data into an electronic mail message, and sending the electronic mail message to the historian in response to an activation event.

In still another aspect, this invention includes a process variable transmitter for capturing and transferring data to a historian. The device includes at least one data sensor, a processor capable of running an electronic mail module, an electronic mail module, a data-formatting module, and a communication link capable of sending electronic mail messages. The transmitter is configured as an electronic mail client, and the data-formatting module causes the device to incorporate the data into an electronic mail message with specifically formatted data as its content and predefined subject as the type of messages and to send the electronic mail message to the historian in response to an activation event.

In a further aspect, this invention includes a historian host. The historian host includes a processor, a storage device, a database, an electronic mail module, a data extraction module, and a communication link capable of receiving electronic mail messages. The data extraction module retrieves electronic mail messages received by the electronic mail module, identifies electronic mail messages having relevant data, extracts the data from the electronic mail messages, and inserts the data into the historian.

In still a further aspect, this invention includes a system for updating data in a remote historian. The system includes at least one process variable transmitter configured as an electronic mail client, the transmitter including at least one data sensor. A processor is also included, along with a data-formatting module, an electronic mail module, and a communication interface capable of sending electronic mail messages. A historian host is provided, which includes an other processor, a data storage device, a database module, an other electronic mail module, a data extraction module, and a communication interface capable of receiving electronic mail messages. The data-formatting module is configured to format the data into a format useful to the historian, to incorporate the data into an electronic mail message, and to send the electronic mail message to the historian host in response to an activation event. The data extraction module is configured to retrieve electronic mail messages received by the other electronic mail module, identify electronic mail messages having relevant data, extract the data from the electronic mail messages, and insert the data into the historian.

DETAILED DESCRIPTION

Where used in this disclosure, the term "historian host" refers to a system including hardware and/or software which hosts a historian. For example, a historian host may include a data storage device and/or processor, as described hereinbelow. The term "historian" refers to any repository used to store historical process data. Examples of historians are disclosed hereinbelow and may include conventional databases, an I/A Series™ historian (Invensys Systems, Inc., Foxboro, Mass.), or an Aim* AT™ historian (Invensys Systems, Inc.).

Figure 2:
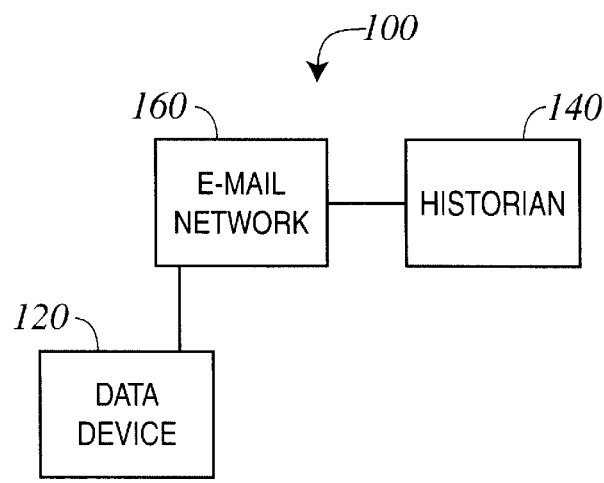
FIG. 2 is a block diagram of one embodiment of a system of the present invention.

Referring to FIG. 2, one embodiment of the present invention is shown as system 100. In general, the system 100 includes one or more devices 120, such as control processors, data sensors, or process variable transmitters, configured as electronic mail (e-mail) clients. These devices 120 are capable of sending e-mail through a standard Transmission Control Protocol/Internet Protocol (TCP/IP) network, e.g., using SMTP and POP3 protocols as discussed hereinbelow. They may also configure process control and/or other historical data in a format that meets the requirements necessary for being imported into any particular historian 147 and send it as an e-mail message over an e-mail network 160. The system 100 generally further includes an historian host 140 configured to have network capability (e.g. including a modem, a network capable operating system, and an e-mail software application) for connecting with an e-mail server 58 of e-mail network 160 and retrieving e-mail messages. The historian host 140 includes a module capable of extracting the data content from the e-mail messages and inserting the extracted data into a historian.

The present invention is advantageous in that it provides for highly robust data storage and substantially eliminates fatal or permanent data loss due to single point failures, due to its 'store-and-forward' functionality discussed in greater detail hereinbelow. Moreover, embodiments of the present invention advantageously provide a highly flexible system for retrieving, storing, and analyzing process control and/or other historical data. For example, the transmitter 120 and/or historian host 140 may be taken offline at substantially any time without data loss since the data may be buffered at one or more locations, including the e-mail outbox of the transmitter 120, e-mail server 58 of e-mail network 160 which typically stores the e-mail messages sent by devices 120 for subsequent retrieval by historian host 140, and/or an inbox of e-mail module 148 of historian host 140. Historian host 140 may be a portable computer allowing the historian 147 to be managed from virtually any location or even in transit between locations, or may be a network-based historian such as the I/A Series™ historian mentioned hereinabove. The present invention may be further advantageous in that each historian does not need a dedicated computer. Instead, a single computer may house and manage multiple unrelated historians (e.g. databases). The number of historians that a given computer may house is typically dependent only on the relative amount of data in the historians and the storage capacity of the host computer. The cost benefits of this advantage may be more fully realized in the future as the storage capacity and computational power of computers continues to increase. Still further advantages of the present invention may be presented, owing to the ubiquitous nature of e-mail, by allowing historians as described herein to be implemented across a wide range of applications without requiring additional software and further providing users with other services commonly provided by e-mail servers, such as Internet access to the world wide web.

In order to enable a comprehensive understanding of the structure and function of the present invention, a description of a typical computer network and electronic mail system is provided, followed by a brief description of the Internet and Internet communication protocols. This discussion is intended merely to provide a general description of a computing environment in which embodiments of the invention may be implemented and is not intended to limit the scope or spirit of the present invention.

Figure 1:
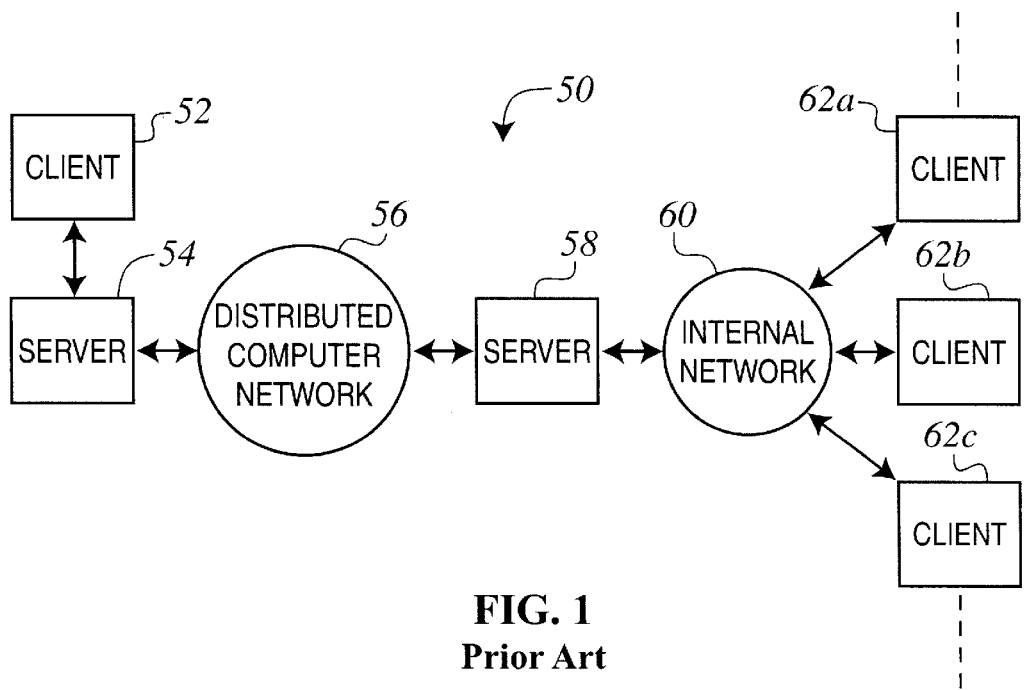
FIG. 1 is a block diagram of a typical client-server environment of the prior art.

FIG. 1 is a block diagram of a typical client-server environment 50. A computer system or client 52, such as a conventional desktop or portable personal computer (PC) or any device operable to communicate digital information over a network, may be connected to an Internet server computer 54 (hereafter referred to as a "server"). The server 54 is typically provided by an Internet Service Provider (ISP), which provides Internet access. The server 54 is connected to a distributed computer network 56, such as the Internet or some other regional or Wide Area Network (WAN), and enables the client 52 to communicate across the distributed computer network 56.

The client 52 communicates across the combination of the server 54 and the distributed computer network 56 to another server 58, such as an e-mail server, or another ISP. In a typical Internet computer network, servers 54 and 58 support e-mail services, contain a message store for holding messages until delivery, and contain a translation facility or gateway for allowing users having different e-mail programs to exchange e-mail messages. The (e-mail) server 58 may be connected to an internal network 60 (e.g. a LAN) that provides connectivity to other clients 62a, 62b, and 62c coupled thereto.

The clients 62a, 62b, and 62c are not only able to respond to a communication from client 52 but may also initiate communication with client 52. The clients 62a, 62b, and 62c may thus send information across the internal network 60 to the server 58. The server 58, may in turn, forward the information to the client 52 via the distributed computer network 56 and server 54.

The Internet, in it's current form, uses a common communication protocol suite, known as a Transmission Control Protocol/Internet Protocol (TCP/IP), which was specifically designed for the interconnection of different computer systems. The various networks integrated by the Internet are linked by regional networks (which include routers) that function to route data packets from a sending network to another router or to a receiving network.

A TCP/IP protocol commonly used on the Internet to route e-mail is known as Simple Mail Transfer Protocol (SMTP). This protocol operates in conjunction with a user's e-mail program and defines control messages used by two computers to exchange e-mail messages. Such control messages include verification of proper connection, identification of sender, negotiation of transmission parameters, and message transmission. SMTP is generally responsible for sending mail created by a local user to another computer and receiving mail from other computers on the network and transferring it to the local user's e-mail program, such as through the user's POP3 (Post Office Protocol 3) server. The POP3 protocol, or similar protocol such as IMAP (Internet Messaging Access Protocol), is commonly used to place SMTP mail received at an e-mail server (e.g., server 58) into the mailbox (i.e., inbox) of a particular client (e.g., client 62a, 62b, 62c).

Typically, computers connected to a WAN such as the Internet are identified as either servers or clients. A server is typically a computer that stores files that are available to other computers connected to the network. For example, an e-mail server typically manages message traffic and mailboxes for users, in addition to translation facilities or gateways. A client is typically a computer (but may be any other electronic device capable of communicating, including Personal Digital Assistants (PDAs), other hand-held devices such as cell phones, minicomputers, micro-controllers, and microprocessor based programmable consumer devices, sensors, detectors, and the like) connected to the network that accesses shared resources provided by a server. To obtain information from a server, a client makes a request for a file or information located on the server using a specified protocol. Upon reception of a properly formatted request, the server downloads the file or information to a local message store located at the client.

Referring again to FIG. 2, an embodiment of the present invention is described in detail. System 100 includes at least one process variable transmitter 120 for collecting, sensing, monitoring, and/or otherwise capturing and transmitting data. In a particular embodiment, transmitter 120 includes an I/A Series® transmitter or Vortex™ flowmeter available from Invensys Systems, Inc. (Foxboro, Mass.). Transmitter 120 is configured as an electronic mail (e-mail) or dial-up client and may be linked to an e-mail network 160. E-mail network 160 may include one or more of the components of the client-server environment 50 described hereinabove with respect to FIG. 1, such as an internal network 60, (e.g., a LAN), server 54 (e.g., of a commercial ISP), and/or a distributed computer network 56 such as the Internet. Transmitter 120 is capable of sending e-mail through a standard TCP/IP network, or alternatively, may communicate through a direct point-to-point (e.g., dial-up) connection. Transmitter 120 may further be configured to utilize any e-mail communications protocol, such as but not limited to, SMTP, Post Office Protocol (POP, POP3, etc.), Internet Message Access Protocol (IMAP), Multipurpose Internet Mail Extensions (MIME), and/or Secure/Multipurpose Internet Mail Extensions (S/MIME). System 100 may also include a computer-implemented data warehouse, also referred to as a historian host 140, capable of receiving e-mail messages from the aforementioned device(s) 120.

Figure 3:
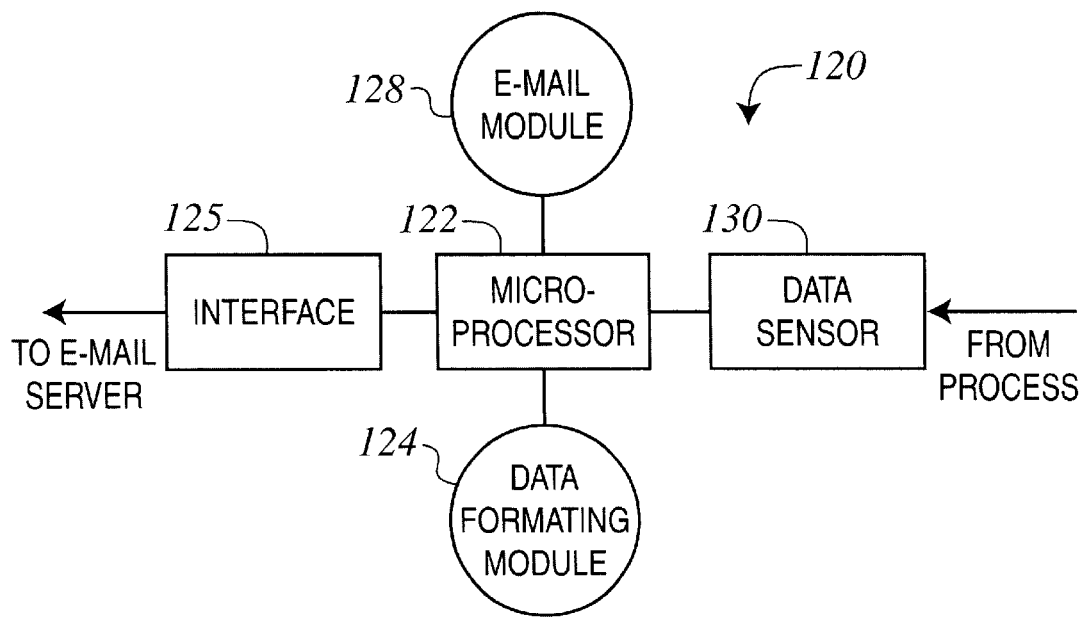
FIG. 3 is a block diagram of one embodiment of the data device portion of the system shown in FIG. 2.

Referring now to FIG. 3, as described hereinabove, transmitter 120 may be any device capable of being configured as an e-mail client, including controllers or other data collection or aggregation devices. Transmitter 120 typically includes an embedded processor (e.g., microprocessor) 122 capable of running an e-mail client module 128. Transmitter 120 further typically includes at least one electronic data sensor 130, which may be any device capable of sensing, collecting, or otherwise capturing data of interest such as but not limited to temperature, pressure, flow rate, velocity, voltage, and current sensors, timers, counters, meters, control elements, such as valves and switches, and/or other data logging devices.

Transmitter 120 may also include a data-formatting module 124. Module 124 functions to retrieve data from data sensor 130, to format the data into a format useful by the historian 147, and to incorporate the formatted data into one or more e-mail messages having a predefined subject indicator to indicate the type of data included therein. The e-mail messages are then sent by email module 128 to interface 125 as described in further detail hereinbelow for transmission to historian host 140 (FIG. 2) in response to an activation event. Data may be incorporated into e-mail messages in any known manner, including by direct incorporation of the data as alphanumeric (e.g., ASCII) characters and/or by attaching a data file. Data may be configured to include any known public or private data format. Representative data formats include ASCII, comma delimited format, binary, hypertext markup language (HTML), extended markup language (XML), data formats usable by applications such as Microsoft® Word™ and Excel™, and the like.

Transmitter 120 typically includes a communication module (e.g., network interface) 125 for facilitating communication with e-mail network 160. Network interface 125 may be any type of interface to network 160 and may be internal and/or external to transmitter 120. For example, network interface 125 may include a modem, a hardwired telephone line, cellular telephone link, an Ethernet or fast Ethernet interface, a LocalTalk® connection, a satellite or other wireless connection, a commercial radio frequency (RF) communication link, an infrared communication link, or the like, including enhancements or alternatives thereto that may be developed in the future. Further, interface 125 may be configured to enable a user to remotely connect with transmitter 120 (e.g. direct dial-up using a modem) to obtain status, diagnostics, or other device information, such as commonly provided in AMR (Automated Meter Reading) devices available from Invensys Measurement Services, Raleigh, N.C. Interface 125 may also be configured to enable a user to remotely connect with transmitter 120 and prompt it to send a data-containing e-mail message.

One particular example of transmitter 120 includes an electronic transmitter for measuring the mass of fluid flowing through a conduit, such as an 83 Series Vortex™ flowmeter available from Invensys Systems, Inc., of Foxboro, Mass. This transmitter includes a data sensor 130, a microprocessor 122, and conventional data transmission electronics configured to generate a 4–20 mA analog signal or a digital signal responsive to mass flow. In accordance with the present invention, this transmitter was provided with a data formatting module 124, i.e., written as a Javag® application, and a JavaMail® API 1.1.3 (available from Sun Microsystems, Inc., Santa Clara, Calif.) which served as e-mail module 128. Both modules 124 and 128 where loaded into memory associated with microprocessor 122. Moreover, e-mail module 128 was optionally configured to send the same email to multiple users (e.g., multiple historian hosts 140).

Figure 4:
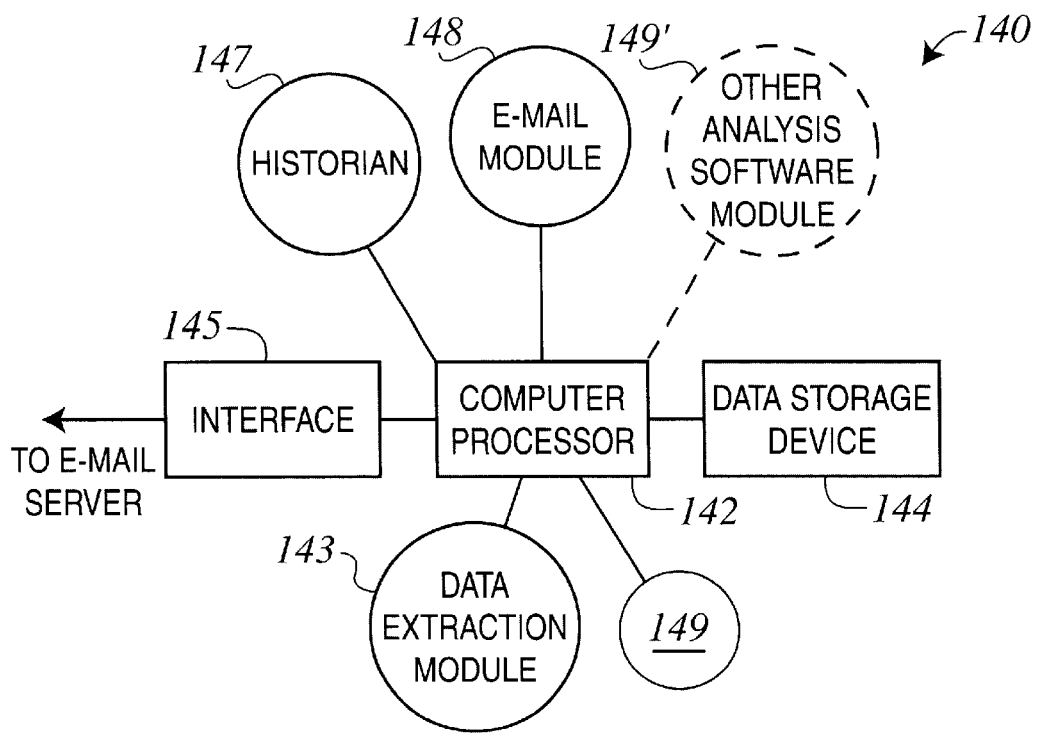
FIG. 4 is a schematic block diagram of one embodiment of the historian host portion of the system shown in FIG. 2.

Referring to FIG. 4, an embodiment of a historian host 140 is illustrated. Historian host 140 may be any suitable electronic data storage system, and is typically implemented in either a desktop or portable personal computer such as an IBM® compatible (such as those available from Dell Computer Corporation, Round Rock, Tex., Hewlett-Packard Company, Palo Alto, Calif., and International Business Machines Corporation, Armonk, N.Y.) or a Macintosh® (Apple Computer, Inc., Cupertino, Calif.) PC. However, historian host 140 may also be implemented within a workstation (e.g. a SPARC® Station available from SUN Microsystems, Inc.) or even a mainframe computer depending on the storage and analysis requirements of the historian and the flexibility requirements of the user(s). For example, historian host 140 may include a microprocessor 142 and a data storage device 144, such as a hard disk drive, a tape drive, an optical disk, a digital video disk, a flash memory card, a removable magnetic disk, and the like. As another example, historian host 140 may include a control processor such as Model CP 60 available from Invensys Systems, Inc. (Foxboro, Mass.). Historian host 140 may further include a network interface 145, such as one of those described above for transmitter 120.

As shown, historian host 140 may include a historian 147 for storing the historical data. Historian 147 may include any commercially available database or spreadsheet program or I/A Series™ historian (Invensys Systems, Inc., Foxboro, Mass.), or an Aim* AT™ historian (Invensys Systems, Inc. Moreover, historian 147 may also include a custom program. Historian host 140 typically further includes an e-mail module 148, such as but not limited to, Netscape® Messenger, Novell® GroupWise®, Qualcomm® Endurra, Microsoft® Outlook® or Exchange, Lotus® Domino®, Pegasus Mail, or another typical e-mail program or groupware for receiving, reading, and managing e-mail. Historian host 140 still further typically includes a data extraction module 143. Extraction module 143 serves to identify and extract the data portion of an incoming e-mail message and to insert the data into the historian 147. The function of module 143 is described in greater detail hereinbelow. Module 143 may be a stand-alone module running in the background of the computer operating system (e.g. Windows 2000 available from Microsoft Corporation) or may be included as an "add-on" into either the historian 147 or the e-mail module 148. The artisan of ordinary skill will readily recognize that modules 143, 147 and 148, or portions thereof, may be embodied in software stored in a node of network 160. Moreover, any or all of the foregoing functionality may be effected in an automated fashion, such as by a module 149, which, for example, includes a Java® application or aplet that implements the receiving and reading of the e-mail, and extraction and insertion effected by module 143, on a predetermined interval.

In a particular example of historian host 140, e-mail server 58 included a Windows® NT™ server used to receive emails sent from transmitter 120. Data extraction module 143 included a software program known as CaTrap™ 1.2 available from Ornic USA, LLC, Wilmington Del., used to extract 270 (FIG. 5) e-mail content into files according to the subject of the e-mail. Historian 147 included a Microsoft® Access™ Database and Excel® spreadsheet. Module 149 included a Java® Applet that placed 280 (FIG. 5) the extracted data into historian 147 using SQL (Structured Query Language), and a JDBC (Java® Database Connectivity) to ODBC (Open Database Connectivity) bridge. Module 149 was called whenever a new e-mail message with pre-specified subject is received 240. Moreover, as an additional option, a Java® servlet™ was included to extract data from historian 147 (e.g., from the Access® database and Excel® spreadsheet) for viewing in a web browser (e.g., Netscape® and Internet Explorer® browsers) using SQL.

Historian host 140 may include other modules 149' for statistical process control and/or other data analysis. Historian host 140 may further include still other modules such as, but not limited to, an operating system, a word processor, graphics and multimedia software, presentation software, Internet browsers, and the like. Further, historian host 140 may include numerous other peripheral input and/or output devices such as, but not limited to, facsimiles, scanners, keyboards, pointing devices, printers, speakers, monitors, and the like. Further still, historian host 140 may include other hardware modules such as, but not limited to, graphics cards, analog to digital adapters, various ports, docking stations, and the like.

Figure 5:
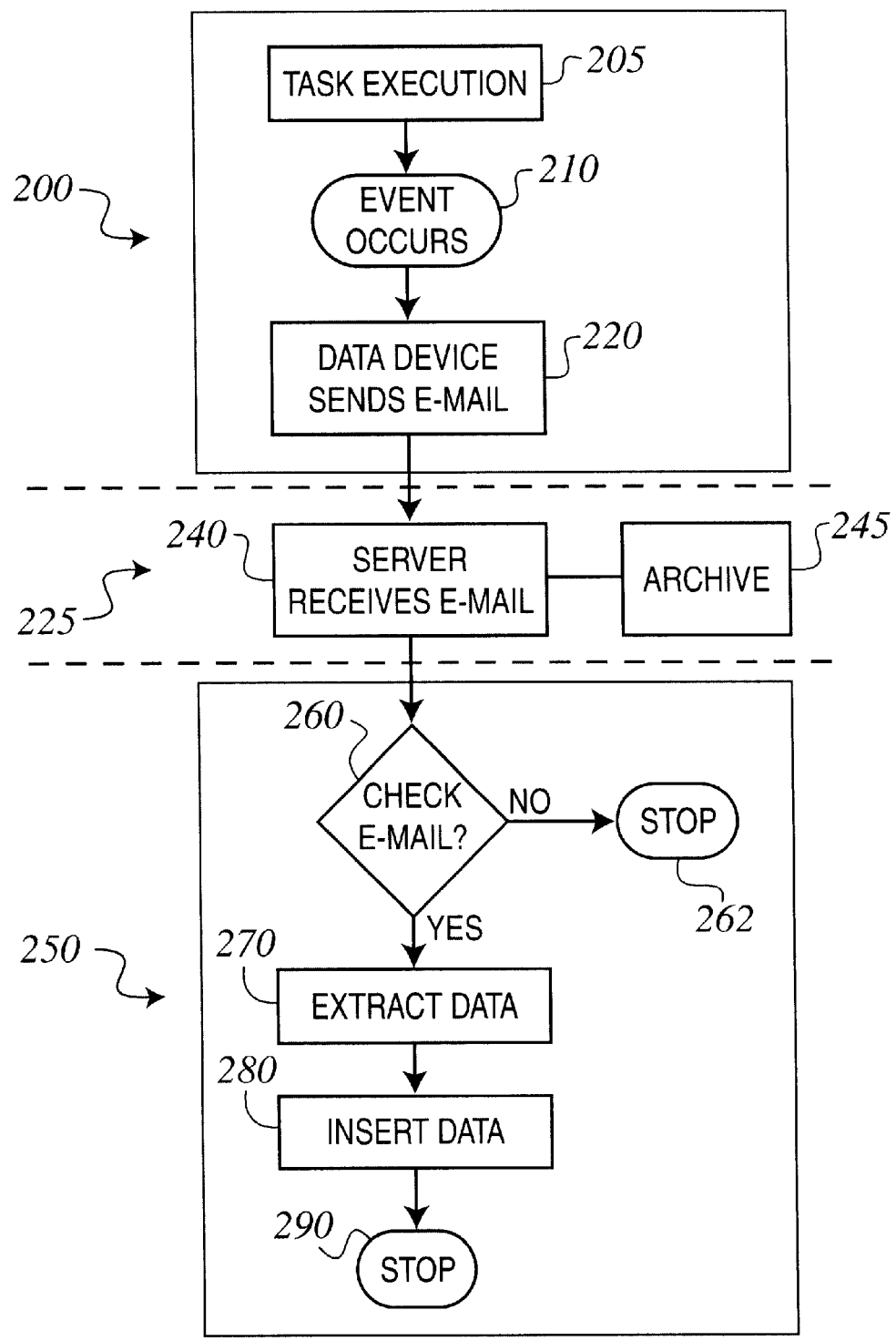
FIG. 5 is a flowchart of an exemplary method of the present invention shown in FIG. 2.

Turning now to FIG. 5, an exemplary method of this invention includes capturing data 200, transporting the data 225, and storing 250 the data in the historian. As shown, data capture 200 includes transmitter 120 executing 205 its assigned task (e.g., capturing gas flow rate data). An activation event (such as a timer signal) triggers 210 transmitter 120 to generate an e-mail message that includes the captured data. The e-mail message is stored in an outbox and subsequently sent 220. (The skilled artisan will recognize that multiple e-mails may be stored in the outbox of transmitter 120 for subsequent transmission.) Data transport includes receipt 240 of the e-mail message by network 160, and storing 245 the message.

Storing 250 includes using historian host 140 to check 260 for new incoming e-mail messages that include data. If an appropriate e-mail message is not present, execution terminates at 262. Otherwise, in the event an e-mail message is present, historian host 140 extracts 270 the data from the e-mail message and inserts it 280 into historian 147. As mentioned hereinabove, this functionality may be effected by a script or Java® application or aplet integrated within historian 147 or operably coupled thereto in a discrete module such as module 149. Moreover, this functionality of historian 140 may be effected either periodically, or may be event-driven, i.e., effected automatically upon receipt of an email.

Figure 6:
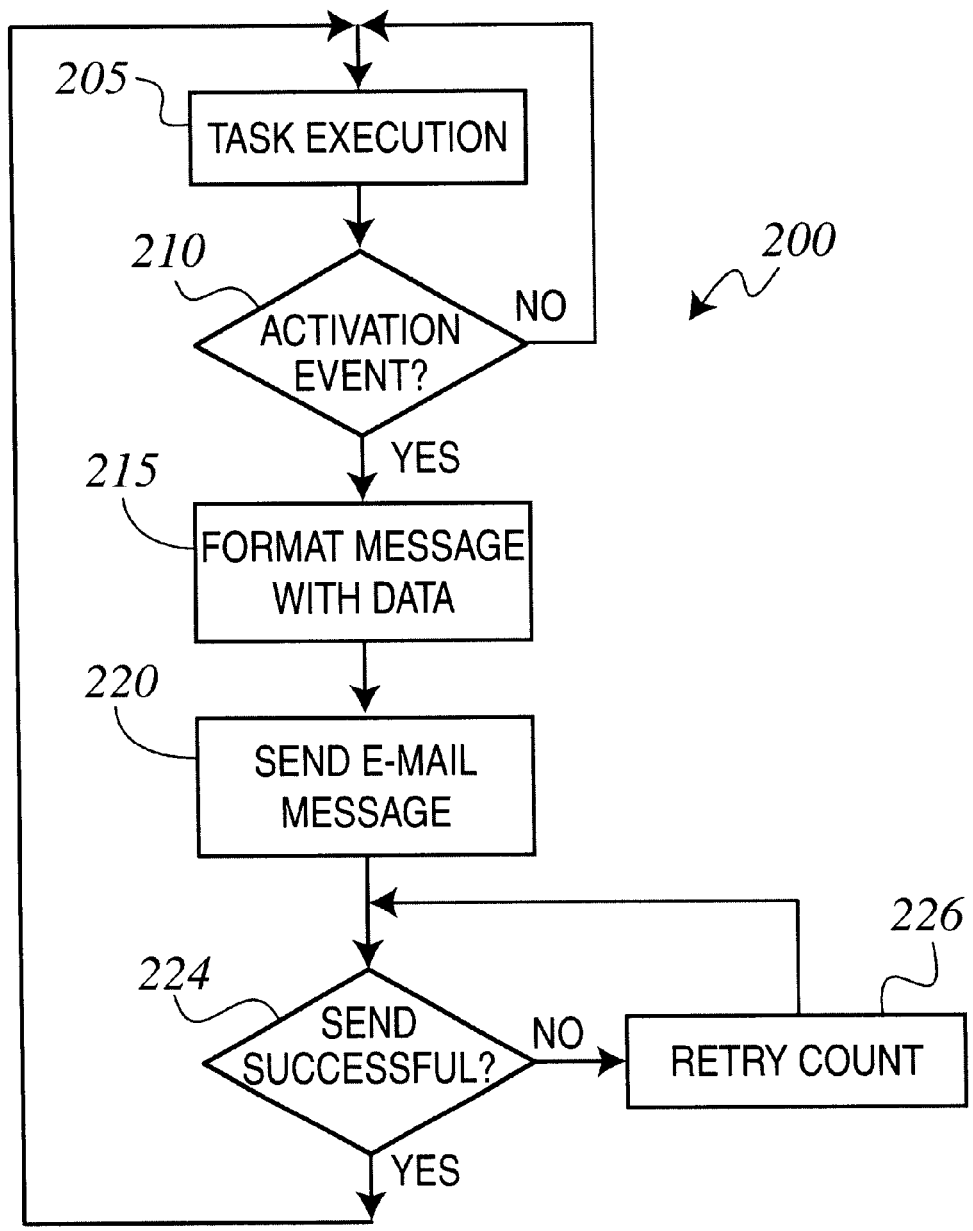
FIG. 6 is a flowchart providing more detail of a portion of the method shown in FIG. 5.

Referring now to FIG. 6, a more detailed embodiment of the data capturing functionality 200 is shown. Execution 205 may include, for example, recording a flow rate (i.e., in the event transmitter 120 is a flow meter) at some time interval (e.g. one data point per second). Likewise, a temperature sensor may be configured to record a temperature reading at some time interval (e.g. one data point per minute). As mentioned hereinabove, activation event trigger 210 may include a timing signal that indicates completion of a predetermined time interval. Alternatively, trigger 210 may include capture 205 of a data point outside a predetermined range. For example, transmitter 120 may be configured to send a data containing e-mail when a data point outside a predetermined range is measured. In the absence an activation event, execution branches back to 205, where transmitter 120 continues to execute its data collection task. Alternatively, in the event an activation trigger or event is detected, transmitter 120 formats 215 an e-mail message including the data, which is then sent 220 to historian host 140. Transmitter 120 then checks 224 to ensure that the e-mail message(s) has been sent successfully. In the event the e-mail message was not sent successfully, transmitter 120 branches 226 execution back to 220 to re-send the e-mail message until successful. Upon successful transfer of the e-mail message, transmitter 120 returns to task execution at step 205.

Figure 7:
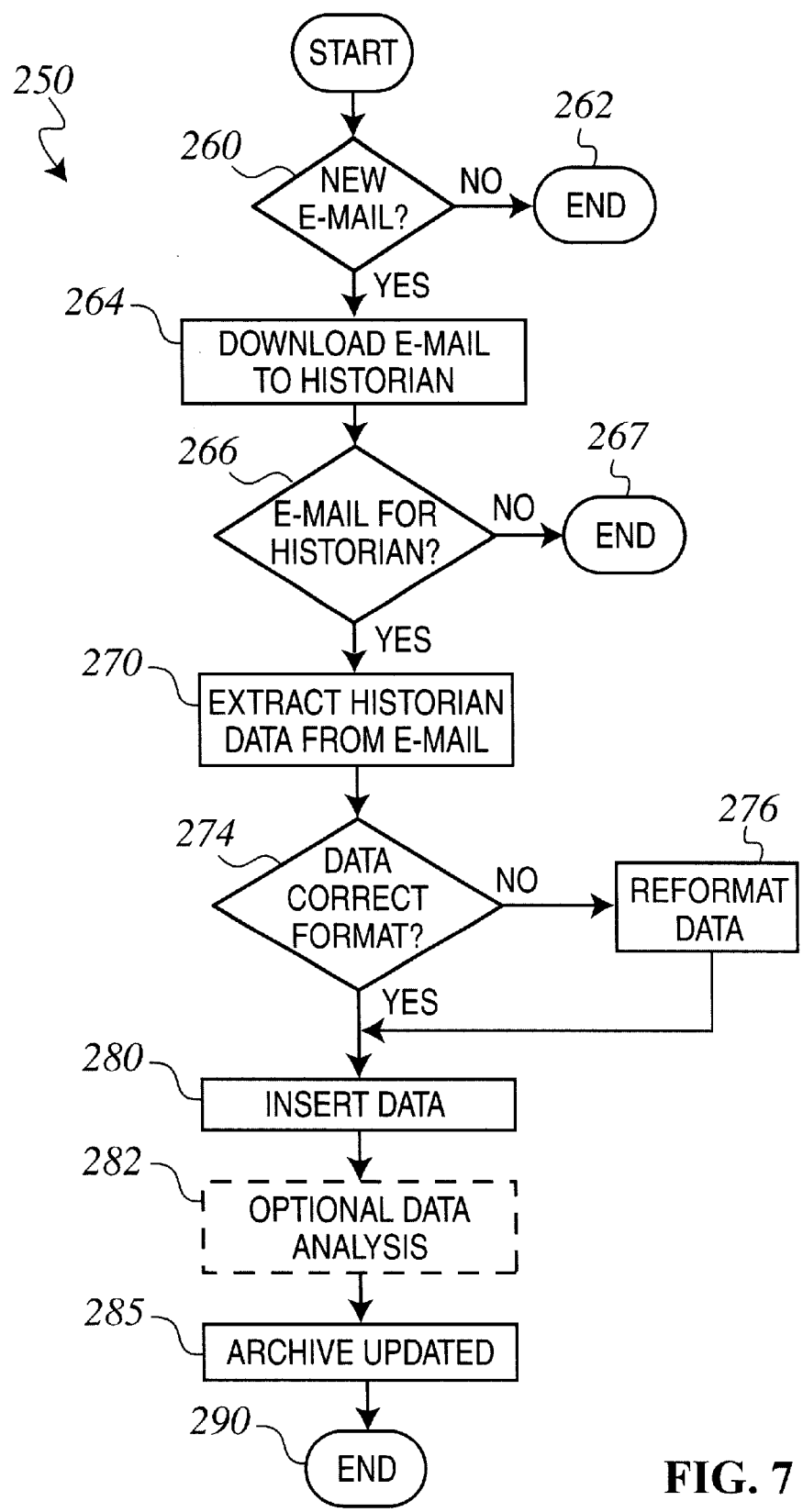
FIG. 7 is a flowchart providing more detail of another portion of the method shown in FIG. 5.

Referring now to FIG. 7, a more detailed embodiment of storage 250 by historian host 140 is shown. After checking 260 for new e-mail messages, any new e-mail messages are downloaded 264 from network 160. Historian host 140 then checks 266 for e-mail messages having indicia (e.g., a subject entry) that indicates that the e-mail message includes data for the historian 147. The indicia indicates a message type used to differentiate messages such as process variables, alarm messages, or the like. If e-mail messages including data for the historian not present, then execution terminates 267. Otherwise, the data portion of the e-mail message(s) is extracted at 270. Historian host 140 then checks 274 to determine whether the data is in a suitable data format. If the data is not in a suitable format, then it is reformatted 276. Suitably formatted data is then inserted 280 into the historian 147. After insertion, optional data analysis routines may be performed at 282. Examples of analysis routines include calculation of averages, sums, differences, standard deviations, control limits, six sigma limits, and the like. At 285, the updated historian 147, including new data and the optional analysis is archived.

The systems and methods of this invention advantageously provide robust and redundant data backup. Electronic mail systems generally provide for highly reliable storage of e-mail messages. Further, e-mail messages (and the data contained therein) are typically backed up at multiple locations, including in the e-mail module 128 of transmitter 120 (e.g., in the outbox, and then the sent box of the e-mail module 128), in one or more electronic mail servers (e.g., servers 54 and 60), and in the e-mail module 148 of historian host 140 (e.g., in the receive box of an e-mail software package). Advantageously, this functionality may prevent loss of data in the event communication with historian host 140 or transmitter 120 is inadvertently interrupted (commonly referred to as single point failures). Any e-mail message transmission that is interrupted for any reason, may generally be retrieved (or re-retrieved) at a later time, from copies stored in the e-mail server 160, and/or in respective outboxes and inboxes of e-mail modules 128 and 148. The present invention may also be practiced in distributed computing environments where tasks are performed by remote processing devices that are linked through a communications network. In a distributed computing environment, program modules may be located in both local and remote memory storage devices. Execution of the program modules may occur locally in a stand-alone manner or remotely in a client/server manner. Examples of such distributed computing environments include local area networks of an office, enterprise-wide computer networks, and the Internet.

Although the foregoing description discloses e-mail communication over the Internet, the skilled artisan will recognize that similar e-mail communication over other networks, such as private LANs, WANs, or Virtual Private Networks (VPNs), whether or not using the Internet, may be used without departing from the spirit and scope of the present invention.

Although this invention has been described according to an exemplary embodiment, it should be understood by those of ordinary skill in the art that modifications may be made without departing from the spirit of the invention. The scope of the invention is not to be considered limited by the description of the invention set forth in the specification, but rather as defined by the following claims.

What is claimed is:

1. A method for updating a process data historian in a process control system with process data captured by a process variable transmitter; said method comprising:

capturing the data with said process variable transmitter, said process variable transmitter having an embedded processor, and being configured as an electronic mail client;

formatting the data into a format useful to the historian;

incorporating the data into an electronic mail message;

sending said electronic mail message to a remote historian host;

receiving said electronic mail message at said remote historian host;

extracting the data from said electronic mail message; and incorporating the data into said historian.

2. The method of claim 1, wherein said historian is disposed within the data historian host.

3. The method of claim 1 wherein said process variable transmitter comprises an embedded processor.

4. The method of claim 3 wherein said process variable transmitter is a member of the group consisting of temperature sensors, pressure sensors, flow rate sensors, velocity sensors, voltage sensors, current sensors, timers, meters, counters, minicomputers, micro-controllers, detectors, and control elements.

5. The method of claim 3 wherein said process variable transmitter comprises a communication module configured to enable a user to remotely retrieve diagnostic information from said process variable transmitter.

6. The method of claim 3 wherein said process variable transmitter comprises a communication module configured to enable a user to remotely prompt said process variable transmitter to send a data-containing electronic mail message.

7. The method of claim 1 wherein said process variable transmitter comprises an Ethernet connection to an electronic mail server.

8. The method of claim 1 wherein said process variable transmitter comprises a modem communicably couplable to an electronic mail server.

9. The method of claim 1 wherein said remote historian host comprises a personal computer.

10. The method of claim 9 wherein said remote historian host comprises a portable computer.

11. The method of claim 1 wherein said incorporating the data comprises incorporating the data into said electronic mail message as an attached file.

12. The method of claim 1 wherein said incorporating the data comprises incorporating the data into the body of said electronic mail message as a series of alphanumeric characters.

13. The method of claim 1 wherein said sending comprises sending said electronic mail message over the Internet.

14. The method of claim 1 wherein said receiving comprises receiving said electronic mail message over the Internet.

15. The method of claim 1 wherein said historian comprises a database.

16. The method of claim 15 wherein said historian is disposed in said remote historian host.

17. The method of claim 15 wherein said historian is disposed in a network server.

18. The method of claim 1 further comprising checking for an activation event.

19. The method of claim 18 wherein said activation event includes an elapsed time interval.

20. The method of claim 18 wherein said activation event includes capturing a data point outside a specified range.

21. The method of claim 1 wherein the data is in a format selected from the group consisting of ASCII, comma delimited format, HTML, XML, MS Word™, or MS Excel™ format.

22. The method of claim 1 further comprising checking the format of the data to determine compatibility with said historian.

23. The method of claim 1 further comprising reformatting the data into a format compatible with said historian.

24. The method of claim 1 further comprising archiving said historian to a storage device.

25. The method of claim 1 further comprising executing a statistical analysis of the data.

26. A method for transferring data captured by a process variable transmitter to a remote historian; said method comprising:

configuring the process variable transmitter as an electronic mail client;

capturing the data with the process variable transmitter;

incorporating the data into an electronic mail message; and sending said electronic mail message to the remote historian in response to an activation event.

27. The method of claim 26, wherein said sending comprises sending said electronic mail message to a remote hist host including said historian.

28. A process variable transmitter for capturing and transferring data to a remote historian, said transmitter comprising:

at least one data sensor;

a processor capable of running an electronic mail module;

an electronic mail module;

a data-formatting module;

a communication module configured to send electronic mail messages;

said transmitter being configured as an electronic mail client; and wherein the data-formatting module formats the data into a format useful to the historian and incorporates the data into an electronic mail message, and said communication module sends said electronic mail message to said historian in response to an activation event.

29. A system for updating data in a historian, said system comprising:

at least one process variable transmitter configured as an electronic mail client, said transmitter including at least one sensor, a processor, a data-formatting module, an electronic mail module, and a communication module configured to sending electronic mail messages;

a historian host, including an other processor, a historian, an other electronic mail module, a data extraction module, and an other communication module capable of receiving electronic mail messages;

said data-formatting module being configured to format the data into a format useful to the historian, and incorporate the data into an electronic mail message;

said electronic mail module being configured to send said electronic mail message to said historian host in response to an activation event; and said data extraction module being configured to retrieve electronic mail messages received by said other electronic mail module, identify electronic mail messages having relevant data, extract the data from said electronic mail messages, and insert the data into said historian.

30. An article of manufacture comprising:

a computer usable medium having computer readable program code embodied therein for incorporating process data captured by a process variable transmitter comprising an email client into an electronic mail message and sending said electronic mail message to a remote historian, said computer readable program code comprising:

computer readable program code for incorporating data captured by the transmitter into an electronic mail message within said email client computer readable program code for formatting the data into a format useful to the historian; and computer readable program code for sending said electronic mail message to the historian in response to an activation event.

* * * * *